Nov. 18, 1958     S. W. ROLPH     2,861,118
STORAGE BATTERY

Filed June 5, 1953     2 Sheets-Sheet 1

INVENTOR.
SAMUEL WYMAN ROLPH
BY Hudson, Coughton,
Williams, David & Hoffmann
ATTORNEYS United States Patent Office 2,861,118
Patented Nov. 18, 1958

2,861,118

STORAGE BATTERY

Samuel Wyman Rolph, Philadelphia, Pa., assignor, by mesne assignments, to The Electric Storage Battery Company, a corporation of New Jersey Application June 5, 1953, Serial No. 359,841

7 Claims. (Cl. 136—177)

The present invention relates to storage batteries and, more particularly, to the maintenance of different electrolyte levels in storage batteries having free electrolyte to provide optimum battery performance with minimum attention when operated at various temperatures or in different climates.

The principal object of the invention is the provision of a novel and improved storage battery having free electrolyte and, more particularly, a lead-acid type of automotive battery so constructed and arranged as to facilitate the maintenance of different electrolyte levels so that a higher level can be maintained in summer or in warm climates, under which conditions the evaporation of electrolyte is greatest, and a lower level and, in turn, a higher acid concentration in winter or in cold climates; that is, under conditions where the evaporation is less but the service requirements imposed upon the battery are relatively heavy.

Another object of the invention is the provision of a novel and improved storage battery and particularly a battery of the type referred to, having an electrolyte level for specific gravity control, including simple and reliable means for readily determining the quantity of water to be added to produce a selected appropriate electrolyte level or specific gravity for the season of the year.

Another object of the invention is the provision of a novel and improved method of operating a storage battery having free electrolyte therein and, more particularly, a lead-acid type automotive battery, which method comprises varying the electrolyte level in accordance with the ambient temperature.

The invention resides in certain steps of operation and combinations and arrangements of parts, as will be hereinafter apparent from the following description of the invention described with reference to the accompanying drawings forming a part of this specification, and in which.

Figure 1:
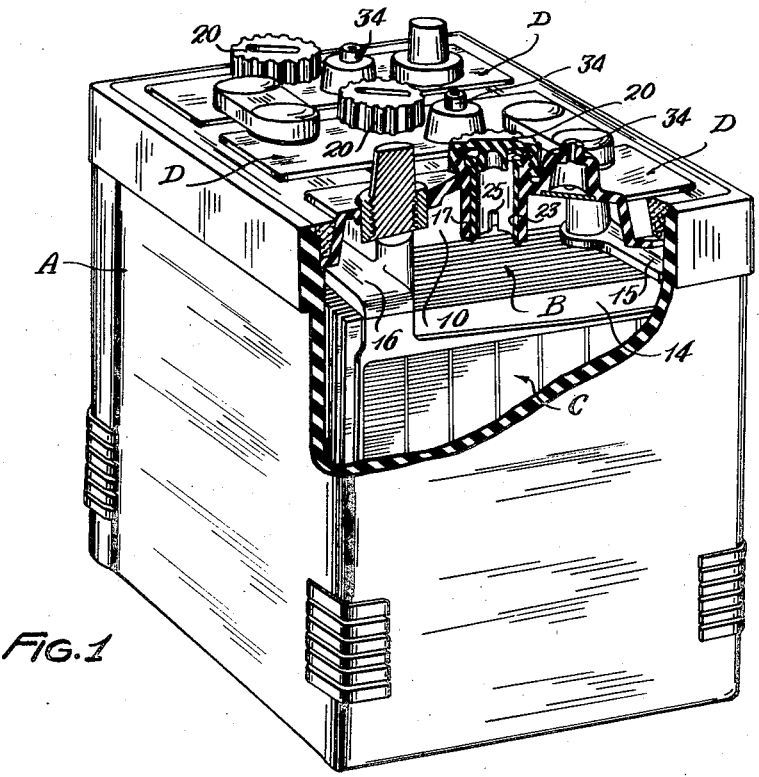
Fig. 1 is a perspective view of a lead-acid type automotive battery embodying the present invention, with parts broken away, to show the internal construction.

While the invention is applicable to and may be embodied in various types of batteries, it is especially applicable to automotive type, lead-acid batteries, and is herein shown and described as embodied in such a battery.

Generally speaking, the battery may be of any conventional construction modified as hereinafter indicated. The batteries shown in the drawings and herein described are automotive, multi-cell, lead-acid batteries and only those parts are shown and described as are necessary to a complete understanding of the present invention.

Referring to the drawings, the batteries shown therein comprise a case, designated generally by the reference character A, of suitable acid resistant material divided by partitions 10 into cell compartments or cells B, within which compartments the respective battery elements C are housed. The battery elements C are of conventional construction except that the connector and terminal posts may be made a little longer than is the usual construction, if desired, to permit the carrying of a higher electrolyte level above the battery elements than normally is the case. Each battery element C comprises negative and positive plates alternately arranged and separated from one another by battery plate separators 14. The positive and negative battery plates are connected in positive and negative groups by plate connecting straps 15, 16, respectively, to which the connector and terminal posts are connected in a well-known manner.

In the batteries illustrated, the cells or cell compartments B are closed at the top by individual cell covers D, and D', Figs. 5-8. However, a single cover or other suitable means may be employed. As previously stated, the present invention contemplates operation of the batteries with different liquid levels or specific gravities, depending upon the temperature to which they are subject in use. To this end, the cell covers shown, which covers form the top walls of the cells, are provided with liquid level or specific gravity controls, it being understood that for any given charge condition of the battery, the specific gravity reading is a function of the quantity of electrolyte present which, in practice, is a function of the level of the electrolyte.

Referring to the embodiment shown in Figs. 1 to 4, which illustrates the invention as applied to a non-overfill or self-levelling type of battery, the cell covers D are alike and each comprises a filling conduit providing a filling opening or well through which water may be added to the respective cells, as desired, and a separate vent conduit providing a vent opening for the escape of gas produced during operation. The vent opening or conduit may, however, be formed as a part of the filling conduit or well opening, if desired, and is so constructed in the embodiment shown in Figs. 5-7. In view of the fact that the cell covers D are alike, only one will be described in detail.

As shown, the filling well or conduit is formed by two aligned, tubular projections or bosses 17, 18, the former projecting from the upper wall or cell cover toward the interior of the cell and the latter projecting upwardly from the cover proper. The outwardly projecting boss 18 is provided with external threads for the reception of a cap or closure member 20 and is counterbored to form an enlargement 21 at the upper end of the opening, designated generally as 22, which opening extends through the cover.

The filling opening or well proper is formed by an inert shown as a tubular member or sleeve 23 rotatably supported within the opening 22 and having a flange 24 on its upper end received in the counterbore 21 with the underside of the flange resting upon the shoulder formed by the counterbore. The lower or inner end of the sleeve 23 is provided with two slots 25 located 180° apart extending approximately ½" inwardly from its lower end and with a relatively small, annular flange 26 engaging underneath the lower end of the member 17, which flange retains the sleeve 23 in position in the opening 22. The sleeve 23 is made of material sufficiently resilient to permit the lower ends thereof to spring inwardly as the sleeve 23 is inserted in the opening 22 from the top and then properly positioned therein to spring outwardly, causing the flanges 26 to engage underneath the end of the member 17.

Figures 3, 4:
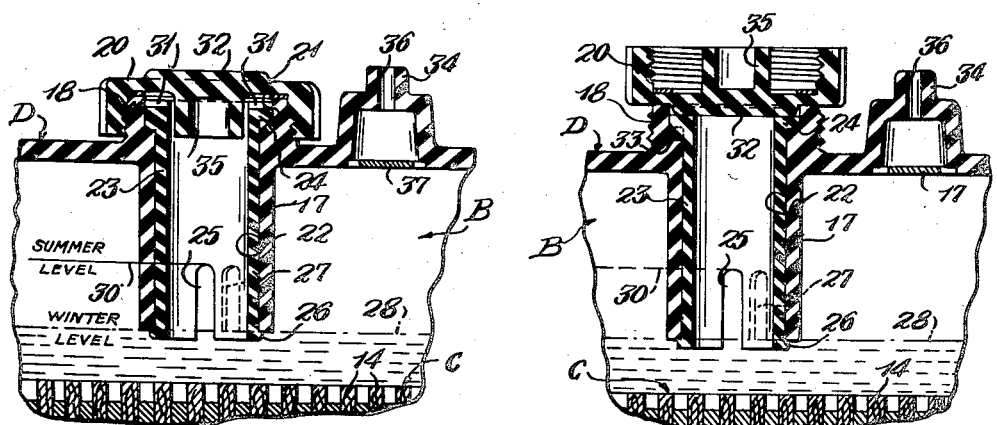
Fig. 3 is a fragmentary sectional view approximately on the line 3—3 of Fig. 2.
Fig. 4 is a view similar to Fig. 3 but with parts shown in a different operating position.
Figure 2:
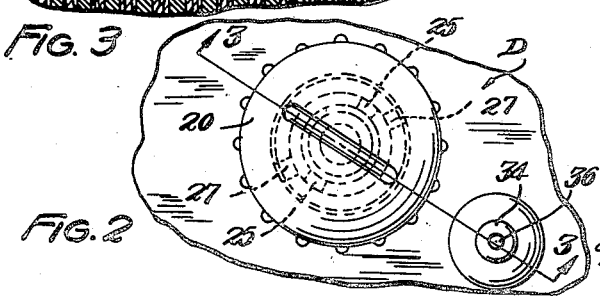
Fig. 2 is a fragmentary plan view of the battery shown in Fig. 1.

The lower end of the boss 17 is provided with slots 27 similar to the slots 25 in the member 23, the construction being such that when the sleeve 23 is in the position shown in the drawings, the slots 25 will be closed by the boss 17 but when rotated slightly in a counter-clockwise direction, as viewed in Figure 2, the slots 25 and 27 will align with each other, thus changing the elevation of the effective opening of the lower end of the filling well above the tops of the plate separators 14 from the level 28 shown in Figs. 3 and 4, and designated "winter level" in Fig. 3 to a level 30 defined by the tops of the slots 25, 27 and designated in Fig. 3 as "summer level." Obviously the slots 25, 27 could be replaced by circular or like holes placed the desired distance from the ends of the relatively rotatable members 17, 23, or some other suitable construction could be employed.

Assuming the battery to be in full charge condition, and that when the battery is in this condition, specific gravity readings of 1.260 and 1.280 are the preferred specific gravity readings for summer and winter operations, respectively, these readings would correspond to acid concentrations of .441 and .478 grains per liter of electrolyte. If the charge condition were different, for example, if the battery were half charged, obviously the acid concentrations and the specific gravity readings would be correspondingly different. The specific gravity can be raised from 1.260 to 1.280 or vice versa by changing the electrolyte level either by allowing water to evaporate from the electrolyte or adding water to the electrolyte. The required change in level depends, among other things, upon the size of the battery cells with reference to their volume, cross-sectional area, etc. If the volume of the electrolyte is about 1650 cc. per cell when the specific gravity reading, under the full charge condition assumed is 1.280, it would require the addition of about 138.4 cc. or 8.4 cu. in. of water, which would amount to about a 12% increase in electrolyte volume of 1788.4 cc. to drop the specific gravity reading to 1.260. Assuming that the cross-sectional area of each cell is 16.9 sq. in. and that the diameter of each post is 0.5 in., the difference between the summer and winter levels would be about 0.6 in. The length of the slots 25, 27 shown would, therefore, be about 0.6 in.

For purposes of facilitating rotation of the sleeve 23 from the position shown in the drawings to a position wherein the slots 25, 27 will be aligned, the upper end of the sleeve 23 is provided with a driving connection in the form of radial slots 31. When the filler cap 20 is removed, these slots may be engaged by a suitable driving instrument, such as a large screw driver or the like. As shown, however, the upper or outer surface of the filler cap 20 is provided with an outwardly projecting, relatively long, narrow projection 32 adapted when the cap is removed and inverted, as shown in Fig. 4, to engage in the grooves 31 for rotating the sleeve. The underside of the annular flange 24 of the sleeve 23 is provided with a lug 33 which normally engages within an arcuate slot in the shoulder upon which the flange rests for limiting rotation of the sleeve 23, one limit being when the slots 25, 27 are aligned.

The vent conduit shown is of more or less conventional construction and includes an upwardly projecting boss 34 adapted to fit into the end of a downwardly projecting boss 35 in the underside of the cap 20 for the purpose of closing the vent opening 36 during the filling operation. The reference character 37 designates a foraminous baffle employed for the purpose of preventing escape of electrolyte through the vent opening.

From the foregoing it will be apparent that when the cap 20 is removed from the filling well and positioned over the vent opening, the battery can be automatically filled to one of two levels, depending upon the position of the sleeve 23. The lower level is particularly adapted for cold weather operation where the evaporation of electrolyte is small and the service conditions imposed upon the battery relatively heavy and the other level which, as shown, is preferably about ½" above the lower level, is particularly adapted for summer operation. In summer, the amount of evaporation is usually greater than that which takes place in winter. The service requirements, however, are usually less severe, which permits the use of an electrolyte of lower specific gravity without materially affecting the operation of the battery and filling the battery to a higher electrolyte level decreases the amount of servicing otherwise required.

Figure 5:
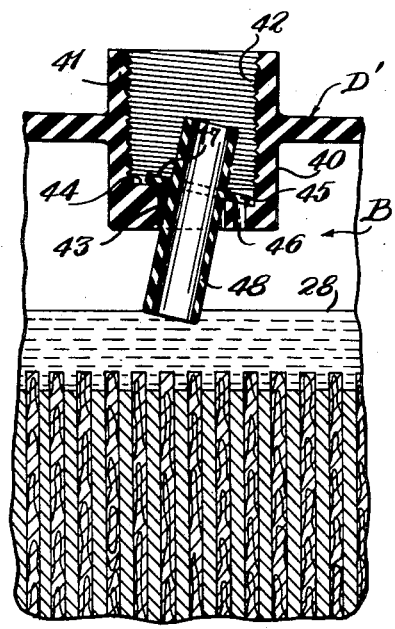
Fig. 5 is a view similar to Fig. 3 but showing a modified construction and having the closure cap for the filling well removed.
Figure 6:
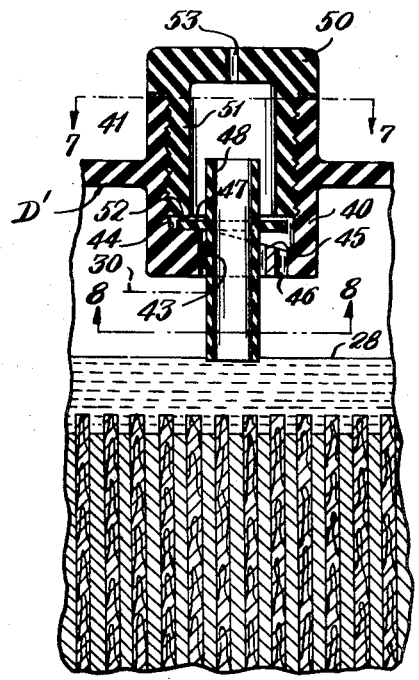
Fig. 6 is a view similar to Fig. 5 with the closure cap for the filling well applied thereto.
Figure 7:
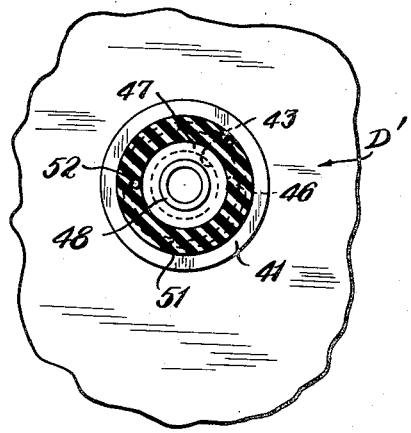
Fig. 7 is a fragmentary sectional view approximately on the line 7—7 of Fig. 6.
Figure 8:
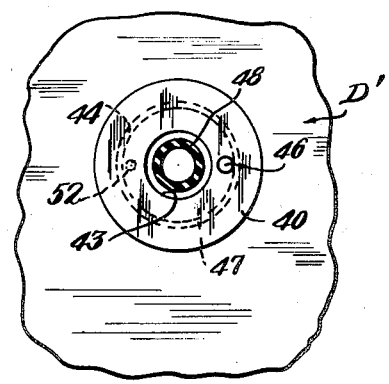
Fig. 8 is a fragmentary sectional view approximately on the line 8—8 of Fig. 6.

In the embodiment shown in Figs. 5–7, the filling and vent conduits are combined as distinguished from the construction shown in Figs. 1–4. As shown in the former figures, the filling well or conduit of the cover D' comprises two aligned bosses 40, 41 projecting downwardly and upwardly of the cover proper. The filling opening through the cover comprises two parts 42, 43 of different diameter connected by an annular ledge or shoulder having a horizontal and an inclined portion 44, 45, respectively. In addition to the opening 43 the boss 40 includes a small vertical hole 46 opening into the lower end of the boss and the inclined surface 45 at its lowest point.

During the refilling operation, the openings 43, 46 are closed by an external, annular skirt or flange 47 on an insert shown as a tubular member 48 positioned in the opening 43 with its annular base portion or flange 47 resting upon the shoulder 45, see Fig. 5. In this position, the tubular member or sleeve 48 is inclined with respect to the vertical and the opening 43 is of sufficient diameter with respect to the outside diameter of the tubular member or sleeve to permit this inclination. Liquid, such as water, poured into the upper end of the filling well rises in the upper part 42 of the filling well until it overflows into the upper end of the tubular member 48; thereafter, it flows into the cell proper until the level of the electrolyte in the cell rises high enough to close the lower end of the sleeve 48. The cap or closure member 50 for the filling well has an externally threaded, downwardly projecting boss 51, the lower end of which is adapted to engage the base or flange 47 of the tubular or sleeve member 48 when the boss 51 is screwed into the internally threaded boss 41. The lower end of the boss 51 engages the flange 47 at its highest point, which is above and spaced from the horizontal portion 44 of the shoulder that supports the sleeve 48 and pivots the sleeve into vertical position opening the vent aperture 46. The lower end of the boss 51 has a plurality of projections 52 which engage the flange 47 and which projections form openings between the lower end of the boss 51 and the flange 47 for the escape of gas therebetween. When the cap 50 is applied, the cell can vent through the opening 46, the spaces between the projections 52 and an opening 53 in the top or cap of the closure member.

The flange 47 is located intermediate the ends of the sleeve 48, being nearer to one end than the other, as shown, about ¼" from the center of the sleeve. With this construction, the insert or tubular member 48 can be inverted, i. e., reversed to obtain two different filling levels approximately ½" apart. The drawings show the insert or sleeve 48 in its winter level position and is inverted to reverse the positions of the tubular projections to obtain the summer level, designated 30.

From the foregoing disclosure and description of the preferred embodiments of the invention, it will be apparent that the objects heretofore enumerated and others have been accomplished and that there has been provided a novel and improved method of operating a battery having an electrolyte level or a specific gravity control incorporated therein, including simple and reliable means for readily determining the quantity of water to be added to produce a selected, appropriate electrolyte level or specific gravity for the season of the year.

While two embodiments of the invention have been shown in the drawings, it is to be understood that the invention is not limited to the particular constructions shown; for example, any liquid level indicator, including so-called reflector type of liquid level indicators, having two properly spaced, liquid level indicating means can be employed to control the liquid level on the specific gravity of the electrolyte of the battery in the manner disclosed, and it is my intention to cover hereby all variations and modifications which come within the practice of those skilled in the art to which the invention relates and within the scope of the appended claims.

Having thus described my invention, I claim:

1. In combination, a storage battery cell cover provided with an opening, a filling well surrounding said opening, and extending downwardly from said cover, a ledge extending along the inner perimeter of said well; and an invertable insert disposed within the well, said insert being supported by said ledge and adapted to indicate different electrolyte levels when in alternate positions; said insert comprising a base provided with an aperture, and an upstanding skirt attached to and extending continuously around said base.

2. In combination, a storage battery cell cover provided with an opening, a filling well surrounding said opening and extending downwardly from said cover, a ledge extending along the inner perimeter of said well, and an invertable insert disposed within the well, said insert being supported by said ledge and adapted to indicate different electrolyte levels when in alternate positions, said insert comprising a base provided with an aperture, and upstanding projections attached to said base.

3. In a storage battery containing free electrolyte, a cell container including a cover having a filling opening, a first filling tube extending downwardly from said filling opening and containing a longitudinal slot at the lower end thereof, a second filling tube rotatably associated with said first tube and having a longitudinal slot at the lower end thereof, the bottoms of said tubes being located at a level to provide an electrolyte volume for cold weather operation of the battery, and the tops of said slots being at a level to provide an optimum electrolyte volume for warm weather operation of the battery.

4. In combination, a container for a storage battery including a cover having a filling opening for electrolyte, a filling well surrounding said opening, and an insert disposed within said well, said insert being movable between two positions within said well and having structure which in a first of said positions establishes an effective length of the filling well to an optimum low level of the electrolyte for cold weather operation of the battery and which in a second of said positions establishes an effective length of said opening to a higher optimum level of the electrolyte for warm weather operation of the battery.

5. The combination of claim 4 in which said filling well depends from said opening to a distance at least equal to said optimum low level of the electrolyte and in which said insert is substantially coextensive in length with said well, said insert and said well having cutaway portions extending from said low level to said high level and adapted to be selectively closed by relative movement of said insert between said two positions for establishment of said different effective lengths of said filling well.

6. The combination of claim 4 in which said well is provided with a ledge extending around its inner perimeter and in which said insert is provided with a flange for engaging said ledge, said insert having axial portions of different length extending in opposite directions from said flange, said insert in said one position establishing by the shorter axial extension said high level of the electrolyte and in the inverted second position establishing said low level of said electrolyte.

7. In combination, a container for a storage battery including a cover having a filling opening for electrolyte, a cap for closing said opening, a filling well surrounding said opening and extending downwardly from said cover, a vent for said container open to atmosphere with said cap in a position closing said filling opening and closed to atmosphere upon movement of said cap from said position closing said filling opening, and an insert disposed within said well, said insert being movable between two positions within said well and having structure which in a first of said positions establishes an effective length of the filling opening to an optimum low level of the electrolyte for cold weather operation of the battery and which in a second of said positions establishes an effective length of said opening to a higher optimum level of the electrolyte for warm weather operation of the battery.

References Cited in the file of this patent

UNITED STATES PATENTS

| | | |
|---|---|---|
| 1,163,992 | Ford | Dec. 14, 1915 |
| 1,354,800 | Butler | Oct. 5, 1920 |
| 2,276,091 | Reppert | Mar. 10, 1942 |
| 2,297,326 | Rieser | Sept. 29, 1942 |
| 2,302,719 | Sandusky | Nov. 24, 1942 |
| 2,302,720 | Sandusky | Nov. 24, 1942 |
| 2,506,952 | Doughty | May 9, 1950 |

OTHER REFERENCES

Storage Batteries, Vinal, 3rd ed., 1940, pages 211–215.